United States Patent
Chung

(10) Patent No.: US 7,916,224 B2
(45) Date of Patent: Mar. 29, 2011

(54) PIXEL ARRAY SUBSTRATE AND LIQUID CRYSTAL DISPLAY

(75) Inventor: Chao-Chun Chung, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 1016 days.

(21) Appl. No.: 11/735,693

(22) Filed: Apr. 16, 2007

(65) Prior Publication Data

US 2007/0242175 A1 Oct. 18, 2007

(30) Foreign Application Priority Data

Apr. 17, 2006 (TW) .............................. 95113600 A

(51) Int. Cl.
G02F 1/1343 (2006.01)
(52) U.S. Cl. ........................................................ 349/38
(58) Field of Classification Search .................. None
See application file for complete search history.

(56) References Cited

U.S. PATENT DOCUMENTS

| 7,692,674 | B2 * | 4/2010 | Kamada et al. | 345/694 |
| 7,834,949 | B2 * | 11/2010 | Tasaka et al. | 349/48 |
| 2005/0068477 | A1 * | 3/2005 | Shin et al. | 349/106 |
| 2006/0290630 | A1 * | 12/2006 | Kim et al. | 345/92 |

* cited by examiner

Primary Examiner — Timothy Rude

(57) ABSTRACT

A pixel array substrate including a substrate, a first patterned conductive layer, a second patterned conductive layer, and pixel electrodes is provided. The first patterned conductive layer has scan lines and gate electrodes. The second patterned conductive layer has data lines, source electrodes, drain electrodes, and capacitor electrodes. The data lines and the scan lines define many pixel areas. Many pixel storage capacitances $C_{ST}$ is formed between the capacitor electrodes and the first patterned conductive layer. Many gate/drain capacitances $C_{GD}$ is formed in an overlapping area of the drain electrodes and gate electrodes. A liquid crystal capacitance $C_{LC}$ is formed above each pixel electrode. In at least one pixel area, the capacitance ratio of $C_{ST}$ and $C_{GD}$ is $\alpha$, the capacitance ratio of $C_{LC}$ and $C_{ST}$ is $\beta$, and the ratio of a first deviation of $C_{ST}$ and a second deviation of $C_{GD}$ is within the range of $\alpha(1+\beta)(1\pm50\%)$.

26 Claims, 8 Drawing Sheets

PIXEL ARRAY SUBSTRATE AND LIQUID CRYSTAL DISPLAY

CROSS REFERENCE TO RELATED APPLICATIONS

The present application is based on and claims priority from Taiwan Patent Application No. 095113600 filed Apr. 17, 2006, the disclosure of which is hereby incorporated by reference in its entirety.

BACKGROUND OF THE INVENTION

1. Field of the Invention

The present invention relates to an array substrate and a display device. More particularly, the present invention relates to a pixel array substrate and a liquid crystal display (LCD).

2. Description of Related Art

Multi-media progress has benefitted from the rapid improvement of semiconductor devices or displays. As for displays, flat panel displays featuring high definition, good space utilization, low power consumption, no radiation, etc., have gradually become mainstream products in the market. Among them, a thin film transistor (TFT) LCD is the most mature flat panel display.

FIG. 1 is a circuit diagram of a conventional TFT-LCD. Referring to FIG. 1, generally speaking, TFTs ($TFT_{10A}$, $TFT_{10B}$, $TFT_{10C}$ ...) of pixels ($P_{10A}$, $P_{10B}$, $P_{10C}$ ...) arranged in the same row of an LCD device are driven by a scan line S10. When the scan line S10 provides a sufficient actuation voltage, the TFTs ($TFT_{10A}$, $TFT_{10B}$, $TFT_{10C}$ ...) connected to the scan line S10 are turned on, such that data (voltage level) loaded on each data line D10 can be written into the pixels ($P_{10A}$, $P_{10B}$, $P_{10C}$ ...). After the above writing operation is completed, the TFTs ($TFT_{10A}$, $TFT_{10B}$, $TFT_{10C}$ ...) are turned off, and the voltage level of the pixel electrode in each pixel ($P_{10A}$, $P_{10B}$, $P_{10C}$ ...) is maintained by a liquid crystal capacitance $C_{LC}$, a pixel storage capacitance $C_{ST}$, etc.

However, when the TFTs ($TFT_{10A}$, $TFT_{10B}$, $TFT_{10C}$ ...) are turned off after charging the pixels, the voltage level of the pixel electrode in each pixel ($P_{10A}$, $P_{10B}$, $P_{10C}$ ...) is liable to be changed under the influence of variations in peripheral voltages. Such a voltage level deviation of the pixel electrode is known as a feed-through voltage ($V_F$). The feed-through voltage is expressed by:

$$V_F = [C_{GD}/(C_{LC}+C_{ST}+C_{GD})] \times \Delta V_G \quad (1)$$

where, in equation (1), $C_{LC}$ is a liquid crystal capacitance, $C_{ST}$ is a pixel storage capacitance, $C_{GD}$ is a capacitance between the gate electrode and the drain electrode of a TFT, and $\Delta V_G$ is a voltage difference of the scan line when the TFTs are turned on and turned off. According to an operating principle of the LCD device, the rotation angles of liquid crystal molecules are changed mainly by the magnitude of an applied electric field, thus representing various gray-scale variations. As the magnitude of the electric field applied to the liquid crystal molecules depends on a voltage difference between a pixel electrode of each pixel and a common electrode, when a ideal driving voltage level of the pixel electrode shifts under the influence of the feed-through voltage $V_F$, a display quality of the LCD device is affected, for example, a flicker phenomenon occurs. Generally speaking, $V_F$ is obtained by estimating the values of $C_{GD}$ and so on, so the flicker phenomenon can be improved through compensation the driving voltage shift ($V_F$) in various conventional techniques in theory.

However, as the trend for the LCD device having been developed toward a greater size, during an exposure and development process using a mask to fabricate a large-sized LCD, it is difficult to control the overall precision of a large-sized mask due to factors such as thermal expansion and cold contraction, such that an overlay alignment error (generally called Overlay deviation) between metal layers of the TFT will become worse. Therefore, as the pixel storage capacitances $C_{ST}$ and the gate/drain capacitances $C_{GD}$ of the pixels are usually distributed everywhere in an exposure range of the large-sized mask, the errors compared with the ideal estimated values become non-negligible. As a result, according to Equation (1), the driving voltages of the pixels cannot be precisely compensated with the estimated values of $V_F$. Thus, flickering of the LCD image occurs.

Further, in a patterning process of each pixel of the LCD, usually it is hard to control the exposure time, dose energy, and photoresist thickness precisely, and thus when defining, for example, the size of the line width of each metal layer of the TFT, an error, for example, deviation due to expansion/shrinkage of the size of the gate electrode, drain electrode, or source electrode, also referred to as line-width error, or so called critical dimension (CD) error, is generated, due to being located in an exposure range. If distributed in the exposure range of the large-sized mask, it becomes difficult to control the patterning process of the pixels in some areas, so the pixel storage capacitance $C_{ST}$ and the gate/drain capacitance $C_{GD}$ of these areas usually have non-negligible errors as compared with the ideal estimated values. As a result, according to Equation (1), the driving voltages of the pixels in each area cannot be compensated exactly with the estimated values of $V_F$. Thus, a flicker or mura of the LCD image occurs.

SUMMARY OF THE INVENTION

The present invention is directed to providing a pixel array substrate, suitable for eliminating the flicker and mura of the image of the LCD device.

The present invention is further directed to providing an LCD device, suitable for eliminating the flicker and mura of the image of the LCD device.

A pixel array substrate for an LCD is provided. The pixel array substrate includes a substrate, a first patterned conductive layer, a second patterned conductive layer, and a plurality of pixel electrodes. The first patterned conductive layer is disposed on the substrate, and at least has a plurality of scan lines and a plurality of gate electrodes. Each of the gate electrodes is connected to a corresponding scan line. The second patterned conductive layer is disposed on the substrate, and at least has a plurality of data lines, a plurality of source electrodes, a plurality of drain electrodes, and a plurality of capacitor electrodes. The data lines and the scan lines define a plurality of pixel areas. A plurality of pixel storage capacitances $C_{ST}$ is formed between the capacitor electrodes and the first patterned conductive layer. A gate/drain capacitance $C_{GD}$ is formed in an overlapping area of each drain electrode and the corresponding gate electrode. The pixel electrodes are respectively disposed in the pixel areas on the substrate. Each pixel electrode is electrically connected to the corresponding drain electrode and the corresponding capacitor electrode, and a liquid crystal capacitance $C_{LC}$ is formed above each pixel electrode. In at least one pixel area, the capacitance ratio of the pixel storage capacitance $C_{ST}$ and the gate/drain capacitance $C_{GD}$ is α, the capacitance ratio of the liquid crystal capacitance $C_{LC}$ and the pixel storage capacitance $C_{ST}$ is β The pixel storage capacitance $C_{ST}$ may has first deviation, and the gate/drain capacitance $C_{GD}$ may has a second deviation. The ratio of the first deviation and the second deviation is within a range of $\alpha(1+\beta)(1\pm50\%)$.

An LCD device including the above-mentioned pixel array substrate, an opposite substrate, and a liquid crystal layer, is further provided. The opposite substrate is disposed above the pixel array substrate, and the liquid crystal layer is disposed between the opposite substrate and the pixel array substrate.

According to an embodiment of the pixel array substrate and the LCD device, in at least one pixel area, the ratio of the first deviation and the second deviation is within the range of $\alpha(1+\beta)(1\pm30\%)$.

According to an embodiment of the pixel array substrate and the LCD device, in at least one pixel area, the capacitance ratio of the first deviation and the second deviation is substantially equal to $\alpha(1+\beta)$.

According to an embodiment of the pixel array substrate and the LCD device, the drain electrodes and the capacitor electrodes span a side of the first patterned conductive layer in a first direction, such that when the first patterned conductive layer and the second patterned conductive layer have an overlay alignment error, the areas of the drain electrodes and the capacitor electrodes overlaid on the first patterned conductive layer increase or decrease simultaneously. Moreover, in at least one pixel area, the width of the drain electrode in the first direction is a first width, the width of the capacitor electrode in the first direction is a second width, and the ratio of the second width and the first width is within the range of $\alpha(1+\beta)(1\pm50\%)$. Preferably, the ratio of the second width and the first width is within the range of $\alpha(1+\beta)(1\pm30\%)$. More preferably, the ratio of the second width and the first width is substantially equal to $\alpha(1+\beta)$. Further, the capacitor electrodes, for example, span a side of the scan line in the first direction. In addition, the first patterned conductive layer, for example, further includes a plurality of common lines, and the capacitor electrodes span a side of the common lines in the first direction.

According to an embodiment of the pixel array substrate and the LCD device, in at least one pixel area, a portion of the contour of the drain electrode on the gate electrode has a first length, a portion of the contour of the capacitor electrode within an area of the first patterned conductive layer has a second length, and the ratio of the second length and the first length is within the range of $\alpha(1+\beta)(1\pm50\%)$. Preferably, the ratio of the second length and the first length is within the range of $\alpha(1+\beta)(1\pm30\%)$. More preferably, the ratio of the second length and the first length is substantially equal to $\alpha(1+\beta)$. Further, the capacitor electrodes, for example, are located above the scan lines. In addition, the first patterned conductive layer, for example, further includes a plurality of common lines, and the capacitor electrodes are located above the common lines.

In an embodiment of the LCD device, a backlight module is further included, and the pixel array substrate, the opposite substrate, and the liquid crystal layer are disposed on the backlight module.

In view of the above, in the pixel array substrate and the LCD device provided by the present invention, the deviation ratio of the pixel storage capacitance $C_{ST}$ and the gate/drain capacitance $C_{GD}$ is within the range of $\alpha(1+\beta)(1\pm50\%)$. Thus, even when the capacitances of the pixel storage capacitance $C_{ST}$ and the gate/drain capacitance $C_{GD}$ change due to the problem of the process, the feed-through voltages $V_F$ of the pixels remain consistent, such that the LCD device can provide uniform images without flicker caused by process deviation.

In order to make the aforementioned and other objectives, features, and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Referring to Equation (1), $V_F=[C_{GD}/(C_{LC}+C_{ST}+C_{GD})]\times \Delta V_G$, if $[C_{GD}/(C_{LC}+C_{ST}+C_{GD}]$ is designed to be a fixed constant k, then $V_F=k\Delta V_G$. The deviation ratio of the pixel storage capacitance $C_{ST}$ and the gate/drain capacitance $C_{GD}$ can be designed to meet the above relation, and the feed-through voltage $V_F$ of each pixel and the voltage difference $\Delta V_G$ of the scan line when the TFTs are turned on and turned off are kept at a constant proportion. In particular, no matter how the pixel storage capacitance $C_{ST}$ and the gate/drain capacitance $C_{GD}$ of each pixel are affected by process deviation and differ from the original design values, the proportion between $V_F$ and $\Delta V_G$ is a constant value which will not be affected. As such, an accurate compensation for the driving voltage shift $V_F$ can be achieved, thereby solving the problem of image flicker.

Figure 1:
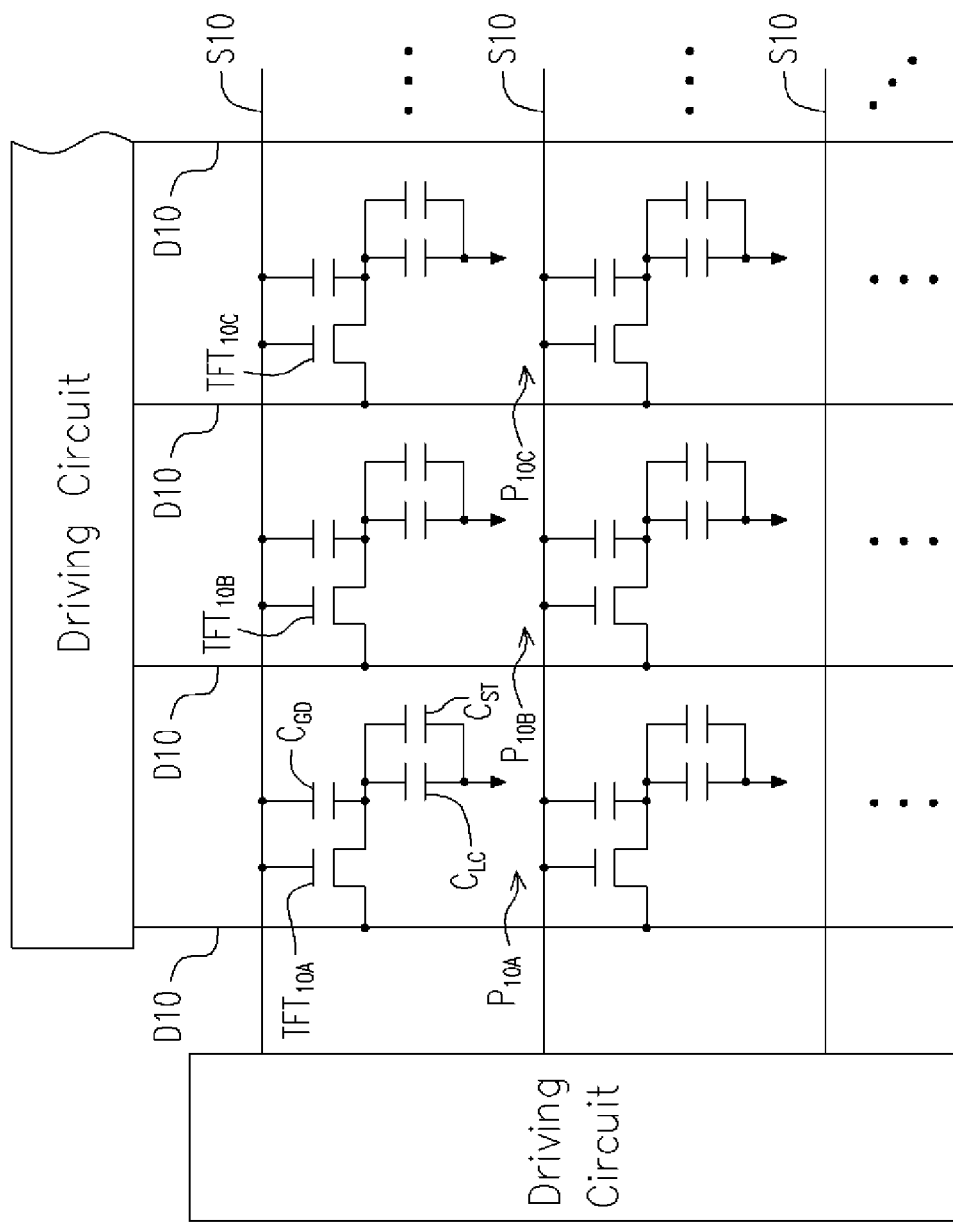
FIG. 1 is a circuit diagram of a conventional TFT-LCD.
Figure 2:
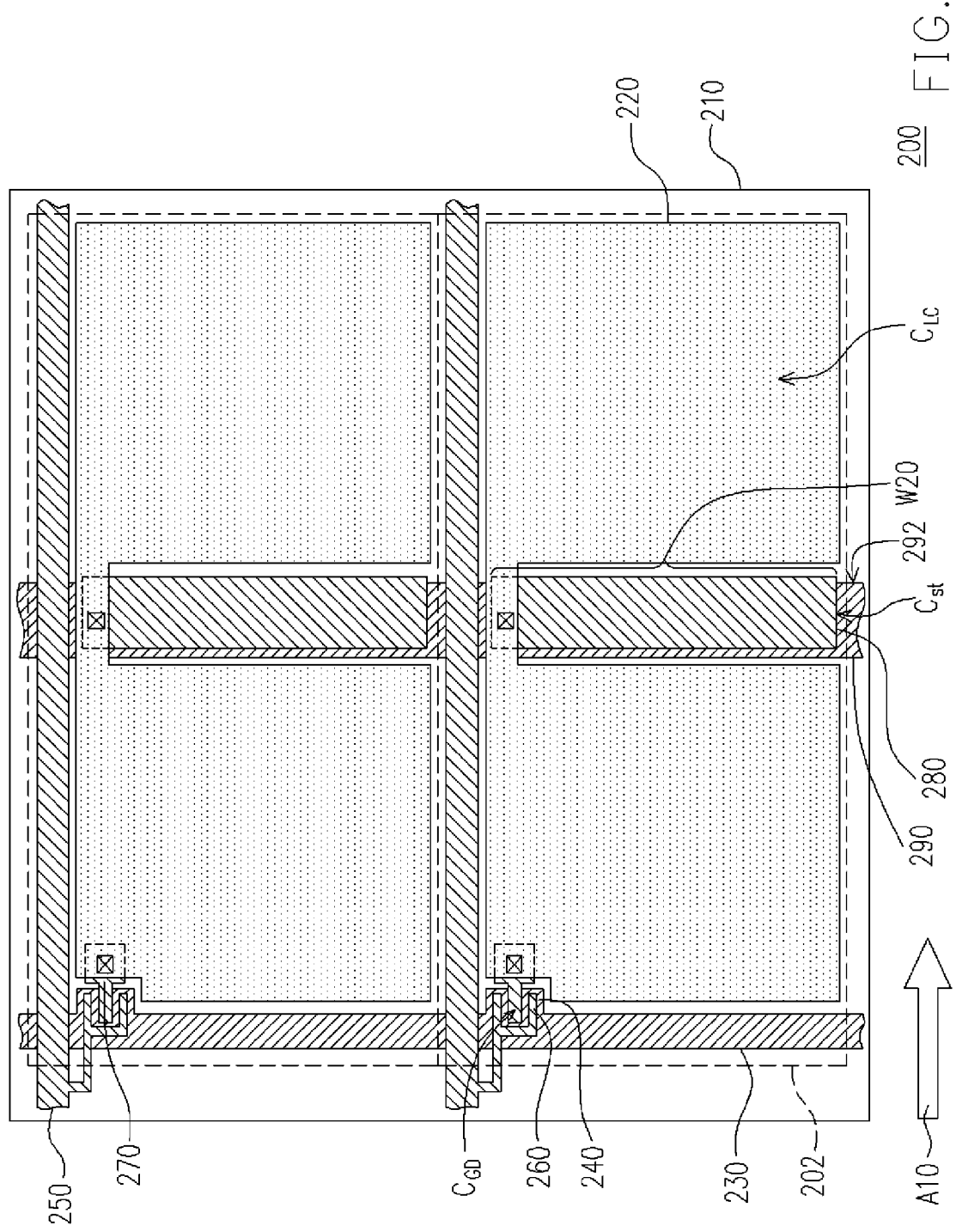
FIG. 2 is a top view of a single pixel area in a pixel array substrate according to a first embodiment of the present invention.

FIG. 2 is a top view of a single pixel area in a pixel array substrate according to a first embodiment of the present invention. Referring to FIG. 2, the pixel array substrate 200 of this embodiment is applicable to an LCD (not shown). The pixel array substrate 200 includes a substrate 210, a first patterned conductive layer, a second patterned conductive layer, and a plurality of pixel electrodes 220. The substrate 210 is, for example, a glass substrate, a silicon substrate, a flexible substrate, or another suitable substrate. The first patterned conductive layer, the second patterned conductive layer, and the pixel electrode 220 are sequentially formed on the substrate 210, and insulating layers are respectively formed between the conductive layers. The first patterned conductive layer includes a plurality of scan lines 230 and a plurality of gate electrodes 240, in which each gate electrode 240 is connected to the corresponding scan line 230. Only one or two of these components is/are shown in FIG. 2 for illustration. In fact, the gate electrodes 240 can also be integrated with the scan lines 230. The second patterned conductive layer includes a plurality of data lines 250, a plurality of source electrodes 260, a plurality of drain electrodes 270, and a plurality of capacitor electrodes 280. The data lines 250 and the scan lines 230 define a plurality of pixel areas 202. Only one or two of these components is/are shown in FIG. 2 for illustration. Each pixel electrode 220 is disposed in each pixel area 202 on the substrate 210 respectively, and each pixel electrode 220 is electrically connected to the corresponding drain electrode 270 and the corresponding capacitor electrode 280.

Further, a channel layer (not shown) is disposed between the source electrode 260, the drain electrode 270, and the gate electrode 240. That is, the channel layer, the source electrode 260, the drain electrode 270, and the gate electrode 240 constitute a TFT, so as to control the data writing of the pixel electrode 220. In addition, the material of the first and second patterned conductive layers is usually metal, the material of the pixel electrode 220 is usually, for example, indium tin oxide (ITO) or another transparent conductive material, and the material of the channel layer is usually a semiconductor material, for example, Si, etc.

Several formulae are given below to illustrate the present invention.

In this embodiment, a pixel storage capacitance $C_{ST}$ is formed between each capacitor electrode 280 and the first patterned conductive layer. One gate/drain capacitance $C_{GD}$ is formed in the overlapping area of each drain electrode 270 and the corresponding gate electrode 240. A liquid crystal capacitance $C_{LC}$ is formed above each pixel electrode 220.

Since the feed-through voltage $V_F$ in the pixel area 202 and $\Delta V_G$ have a relation expressed by Equation (1). In order to prevent the process deviation to cause error of the feed-through voltage $V_F$ in the pixel area 202, $[C_{GD}/(C_{LC}+C_{ST}+C_{GD})]$ in the pixel area 202 need to be a constant value. That is, the pixel area 202 should satisfy the following relational expression:

$$\frac{C'_{GD}}{C'_{ST}+C'_{LC}+C'_{GD}} = \frac{C_{GD}+\Delta C_{GD}}{(C_{ST}+\Delta C_{ST})+(C_{LC}+\Delta C_{LC})+(C_{GD}+\Delta C_{GD})} =$$

$$\frac{C_{GD}}{C_{ST}+C_{LC}+C_{GD}} = k$$

and then, $\dfrac{\Delta C_{GD}}{\Delta C_{ST}+\Delta C_{LC}+\Delta C_{GD}} = \dfrac{C_{GD}}{C_{ST}+C_{LC}+C_{GD}}$ where, C and C' respectively stand for the ideal capacitance and actual capacitance of the pixel area 202, ΔC is set to be the difference (an error value between the actual and ideal values due to process deviation) between C and C', and k is a constant value.

In each pixel area 202, if the capacitance ratio of the ideal pixel storage capacitance $C_{ST}$ and the ideal gate/drain capacitance $C_{GD}$ is α, the capacitance ratio of the ideal liquid crystal capacitance $C_{LC}$ and the ideal pixel storage capacitance $C_{ST}$ is β, then $$\frac{\Delta C_{GD}}{\Delta C_{ST}+\Delta C_{LC}+\Delta C_{GD}} =$$

$$\frac{C_{GD}}{C_{ST}+C_{LC}+C_{GD}} = \frac{1}{\frac{C_{ST}}{C_{GD}}\left(1+\frac{C_{LC}}{C_{ST}}\right)+1} = \frac{1}{\alpha(1+\beta)+1}$$

As such, if $$\frac{\Delta C_{GD}}{\Delta C_{ST}+\Delta C_{LC}+\Delta C_{GD}}$$

generated due to process deviation is designed to be equal to $$\frac{1}{\alpha(1+\beta)+1},$$

then $V_F=k\Delta V_G$, and $V_F$ is a constant value.

In a common process for pixel array substrate, two process deviations on TFT array are Overlay deviation and CD deviation.

As for Overlay deviation, in order to prevent the error of the feed-through voltage $V_F$ in different pixel areas 202 caused by the Overlay deviation, $$\frac{\Delta C_{GD(overlay)}}{\Delta C_{ST(overlay)}+\Delta C_{LC(overlay)}+\Delta C_{GD(overlay)}}$$

can be designed to be equal to $$\frac{1}{\alpha(1+\beta)+1},$$

in which the liquid crystal capacitance $C_{LC}$ does not change with Overlay deviation. As the capacitance is related to a coupling area of the upper and lower electrodes in the capacitor, the following formula is obtained:

$$\frac{C_{GD}\text{width in the same direction}\cdot(\text{overlay deviation})}{C_{ST}\text{width in the same direction}\cdot(\text{overlay deviation})+} = \frac{1}{\alpha(1+\beta)+1}$$
$C_{GD}$width in the same direction·(overlay deviation)

$$\rightarrow \frac{1}{\frac{C_{ST}\text{width in the same direction}}{C_{GD}\text{width in the same direction}}+1} = \frac{1}{\alpha(1+\beta)+1}$$

$$\rightarrow \frac{C_{ST}\text{width in the same direction}}{C_{GD}\text{width in the same direction}} = \alpha(1+\beta)$$

As for CD deviation, in order to prevent the error of the feed-through voltage $V_F$ in pixel areas 202 caused by CD deviation, $$\frac{\Delta C_{GD(CD)}}{\Delta C_{ST(CD)}+\Delta C_{LC(CD)}+\Delta C_{GD(CD)}}$$

can be designed to be equal to $$\frac{1}{\alpha(1+\beta)+1}.$$

Similarly, the following formula can be deduced:

$$\frac{C_{ST} \text{design perimeter length}}{C_{GD} \text{design perimeter length}} = \alpha(1+\beta)$$

Thus, the deviation ratio of the pixel storage capacitance $C_{ST}$ and the gate/drain capacitance $C_{GD}$ should be designed to be in the range of $\alpha(1+\beta)(1\pm50\%)$. Preferably, the deviation ratio of the pixel storage capacitance $C_{ST}$ and the gate/drain capacitance $C_{GD}$ should be designed to be in the range of $\alpha(1+\beta)(1\pm30\%)$. More preferably, the deviation ratio of the pixel storage capacitance $C_{ST}$ and the gate/drain capacitance $C_{GD}$ should be designed to be $\alpha(1+\beta)$ substantially.

Figure 3:
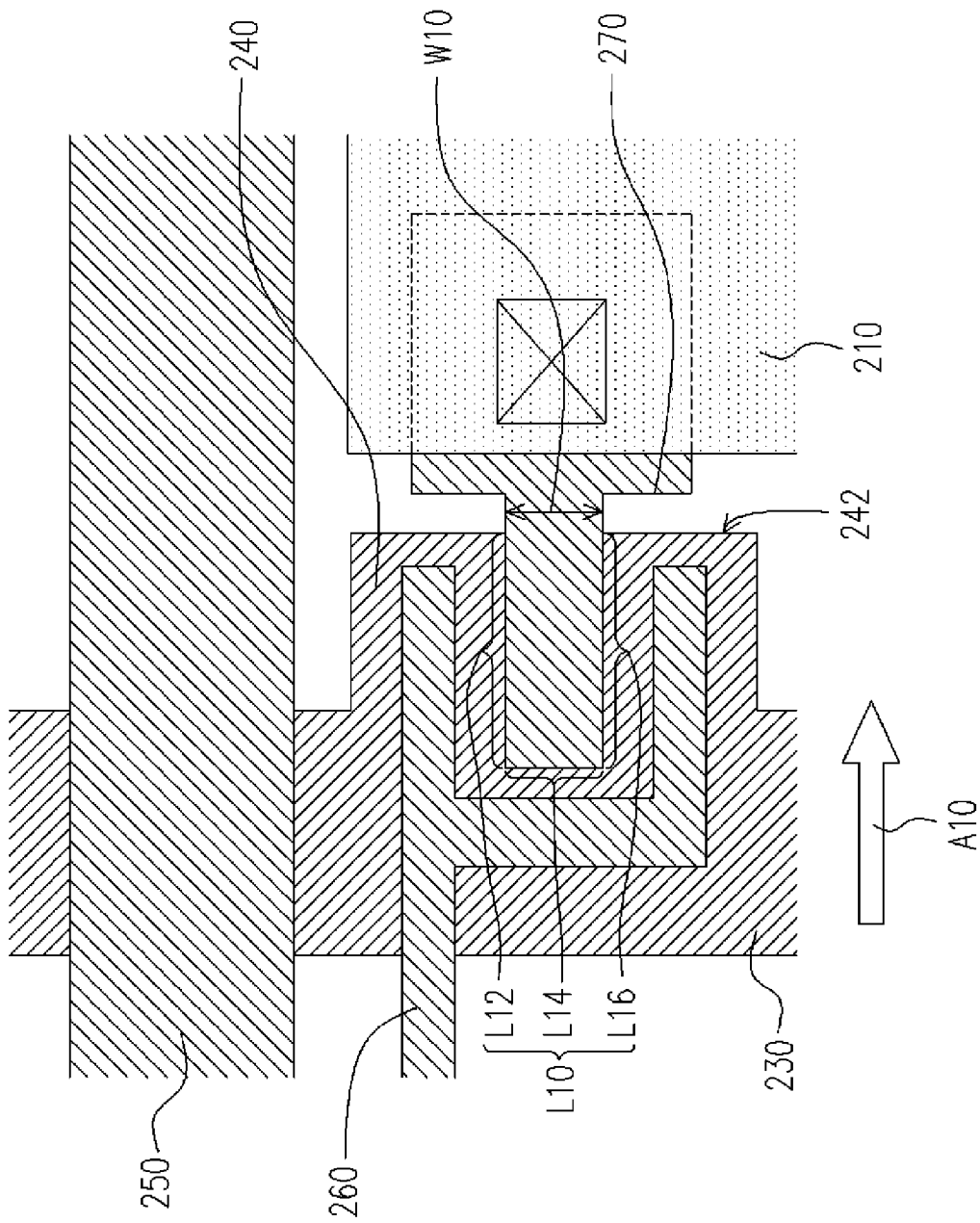
FIG. 3 is a partial enlarged view of a TFT shown in FIG. 2.

FIG. 3 is a partial enlarged view of the TFT in FIG. 2. Referring to FIGS. 2 and 3, to make the deviation ratio of the pixel storage capacitance $C_{ST}$ and the gate/drain capacitance $C_{GD}$ meet the above requirements, the drain electrodes 270 and the capacitor electrodes 280 can be designed to span a side of the first patterned conductive layer in a first direction A10. In particular, the first patterned conductive layer of this embodiment further includes a plurality of common lines 290 (only one as shown in FIG. 2). The capacitor electrodes 280 span a side 292 of the common lines 290 in the first direction A10, and the drain electrodes 270 span a side of the gate electrodes 240 in the first direction A10.

Thus, when the first patterned conductive layer and the second patterned conductive layer have process errors such as overlay alignment errors during the exposure process, for example, when the second patterned conductive layer shifts towards the first direction A10 relative to the first patterned conductive layer, the overlapping area of the drain electrodes 270 and the gate electrodes 240 decreases, and meanwhile the overlapping area of the capacitor electrodes 280 and the common lines 290 decreases. As such, the capacitances of the pixel storage capacitance $C_{ST}$ and the gate/drain capacitance $C_{GD}$ decrease at a certain proportion simultaneously, i.e., decrease at a proportion of $\alpha(1+\beta)$ simultaneously. That is, the deviation ratio of the pixel storage capacitance $C_{ST}$ and the gate/drain capacitance $C_{GD}$ is substantially equal to $\alpha(1+\beta)$. On the contrary, when the second patterned conductive layer shifts towards an inverse direction of the first direction A10 due to process deviation, the overlapping area of the drain electrodes 270 and the gate electrodes 240 increase, and meanwhile the overlapping area of the capacitor electrodes 280 and the common lines 290 increases. As such, the capacitances of the pixel storage capacitance $C_{ST}$ and the gate/drain capacitance $C_{GD}$ increases at a certain proportion simultaneously, i.e., increased at a proportion of $\alpha(1+\beta)$ simultaneously, then:

$$\frac{C'_{GD}}{C'_{ST}+C'_{LC}+C'_{GD}} = \frac{C_{GD}}{C_{ST}+C_{LC}+C_{GD}},$$

That is, k is kept a constant value, free of the impact of process deviation.

More particularly, if in each pixel area 202, the width of the drain electrodes 270 in the first direction A10 is a first width W10, the width of the capacitor electrodes 280 in the first direction A10 is a second width W20, and the ratio of the second width W20 and the first width W10 are designed to be within the range of $\alpha(1+\beta)(1\pm50\%)$. As the drain electrodes 270 and the capacitor electrodes 280 have the same shift in the first direction A10, and the widths of the drain electrodes 270 and the capacitor electrodes 280 in the first direction A10 meet the above relation, the ratios of the overlapping area deviation of the drain electrodes 270 and the gate electrodes 240 and that of the capacitor electrodes 280 and the common lines 290 also meet the relation of being within the range of $\alpha(1+\beta)(1\pm50\%)$, and increase or decrease simultaneously. In other words, even if the first patterned conductive layer and the second patterned conductive layer have an overlay alignment error in the process, as the capacitance is related to the overlapping area of the two conductive layers that produce capacitance, the deviation ratio of the pixel storage capacitance $C_{ST}$ and the gate/drain capacitance $C_{GD}$ can also be kept within the range of $\alpha(1+\beta)(1\pm50\%)$. Further, the ratio of the second width W20 and the first width W10 can be preferably designed to be within the range of $\alpha(1+\beta)(1\pm30\%)$. More preferably, the ratio of the second width W20 and the first width W10 can be designed into $\alpha(1+\beta)$ substantially. Consequently, the deviation ratio of the pixel storage capacitance $C_{ST}$ and the gate/drain capacitance $C_{GD}$ remaining in the range of $\alpha(1+\beta)(1\pm30\%)$ or substantially equal to $\alpha(1+\beta)$. According to this embodiment, the problem that the feedthrough voltage $V_F$ cannot be accurately compensated due to process deviation such as overlay alignment error of the patterned conductive layers can be eliminated.

Figure 4:
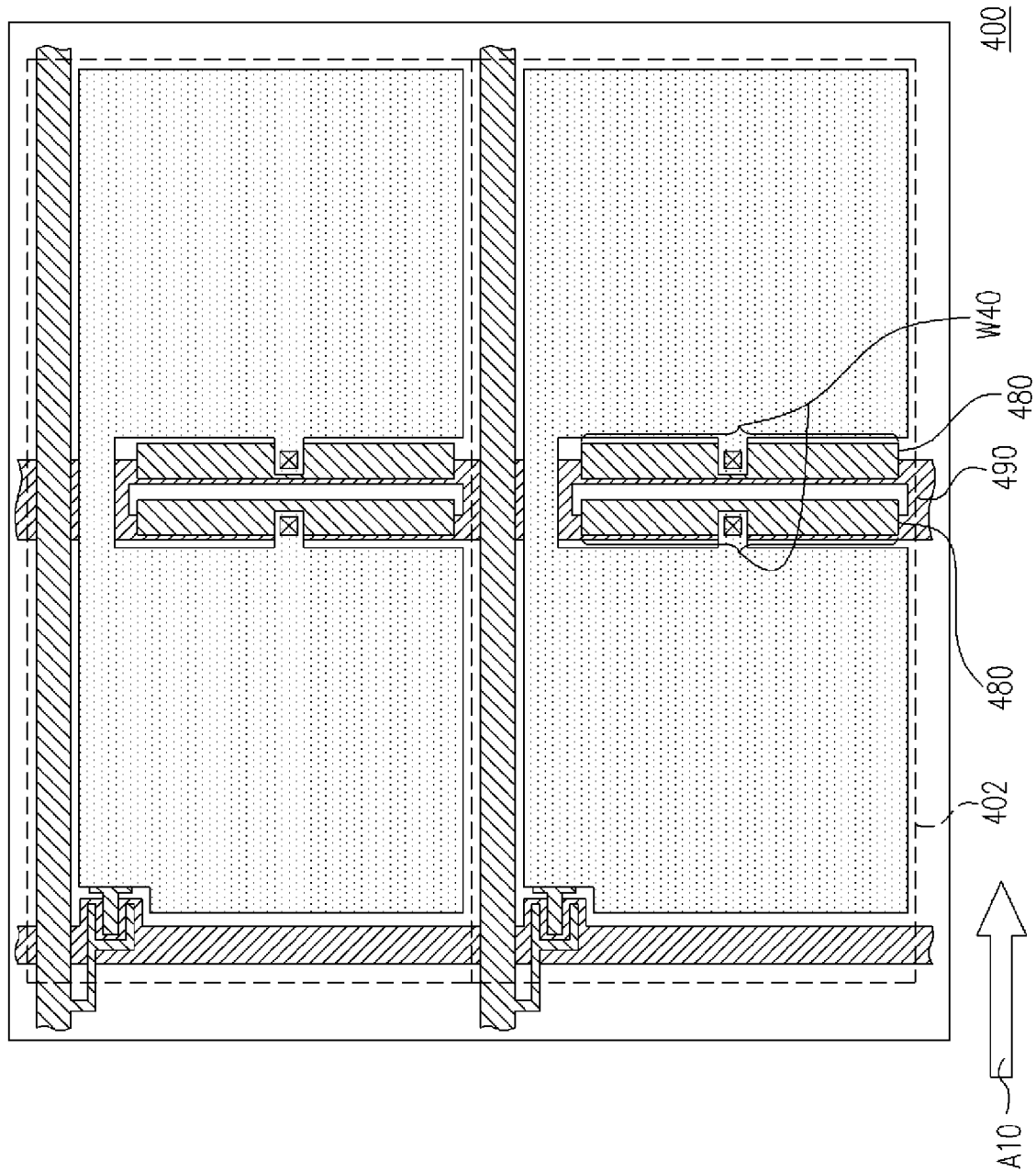
FIG. 4 is a top view of a single pixel area in a pixel array substrate according to a second embodiment of the present invention.

FIG. 4 is a top view of a single pixel area in the pixel array substrate according to a second embodiment of the present invention. Referring to FIG. 4, the pixel array substrate 400 of this embodiment differs from the pixel array substrate 200 in FIG. 2 in the design manner of the capacitor electrodes and the common lines, and the rest of components are indicated with the same symbols and the details will not be described herein again. In this embodiment, two capacitor electrodes 480 are designed in a single pixel area 402, and the corresponding portion of the common lines 490 is designed to have two branch lines, such that the two capacitor electrodes 480 respectively span two sides of the two branch lines of the common lines 490 in a same first direction A10. Thus, the width W40 of the capacitor electrodes 480 in the first direction A10 increases. As such, it is easier to keep the deviation ratio of the pixel storage capacitance $C_{ST}$ and the gate/drain capacitance $C_{GD}$ within the range of $\alpha(1+\beta)(1\pm50\%)$ or $\alpha(1+\beta)(1\pm30\%)$, or even substantially equal to $\alpha(1+\beta)$. Definitely, other design parameters can be adopted to achieve the purpose of increasing the width W40 of the capacitor electrodes 480 in the first direction A10. Nevertheless, this embodiment is merely exemplary and not limiting on the present invention.

Figure 5:
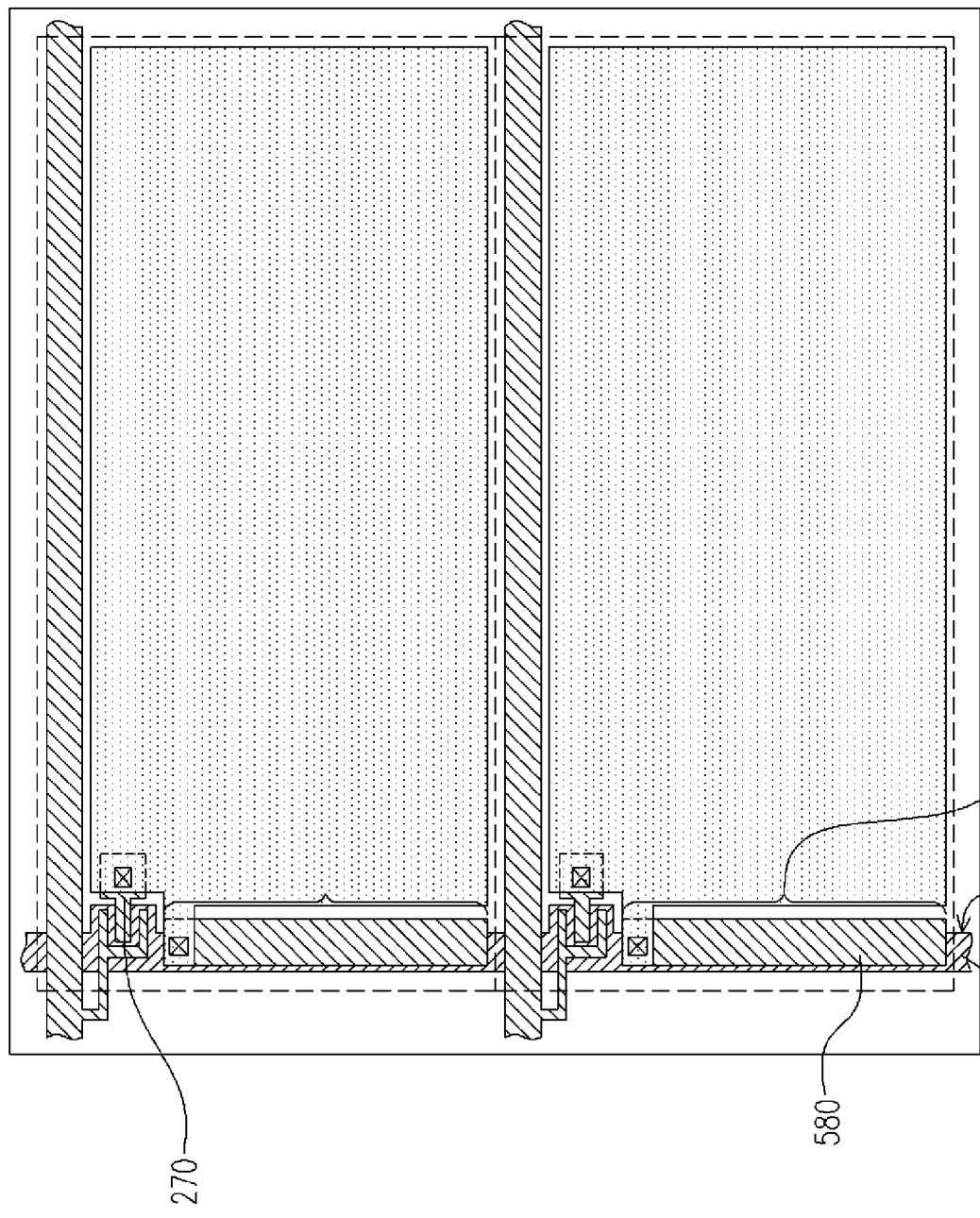
FIG. 5 is a top view of a single pixel area in a pixel array substrate according to a third embodiment of the present invention.

FIG. 5 is a top view of a single pixel area in a pixel array substrate according to a third embodiment of the present invention. Referring to FIG. 5, the pixel array substrate 500 of this embodiment differs from the pixel array substrate 200 in FIG. 2 in that the position of the capacitor electrodes is changed and the design of common lines is saved. The rest of components are indicated with the same symbols and the details will not be described herein again. In this embodiment, the capacitor electrodes 580 span a side 232 of the scan lines 230 in the first direction A10. The ratio of the width W50 of the capacitor electrodes 580 in the first direction A10 and the first width W10 of the drain electrodes 270 (as shown in FIG. 3) is within the range of $\alpha(1+\beta)(1\pm50\%)$, or $\alpha(1+\beta)(1\pm30\%)$, or is substantially equal to $\alpha(1+\beta)$.

In the above embodiments, the drain electrodes and the capacitor electrodes are designed to span the same side of the first patterned conductive layer, so as to achieve the purpose of the present invention. Another way of implementing the present invention is described below.

Figure 6:
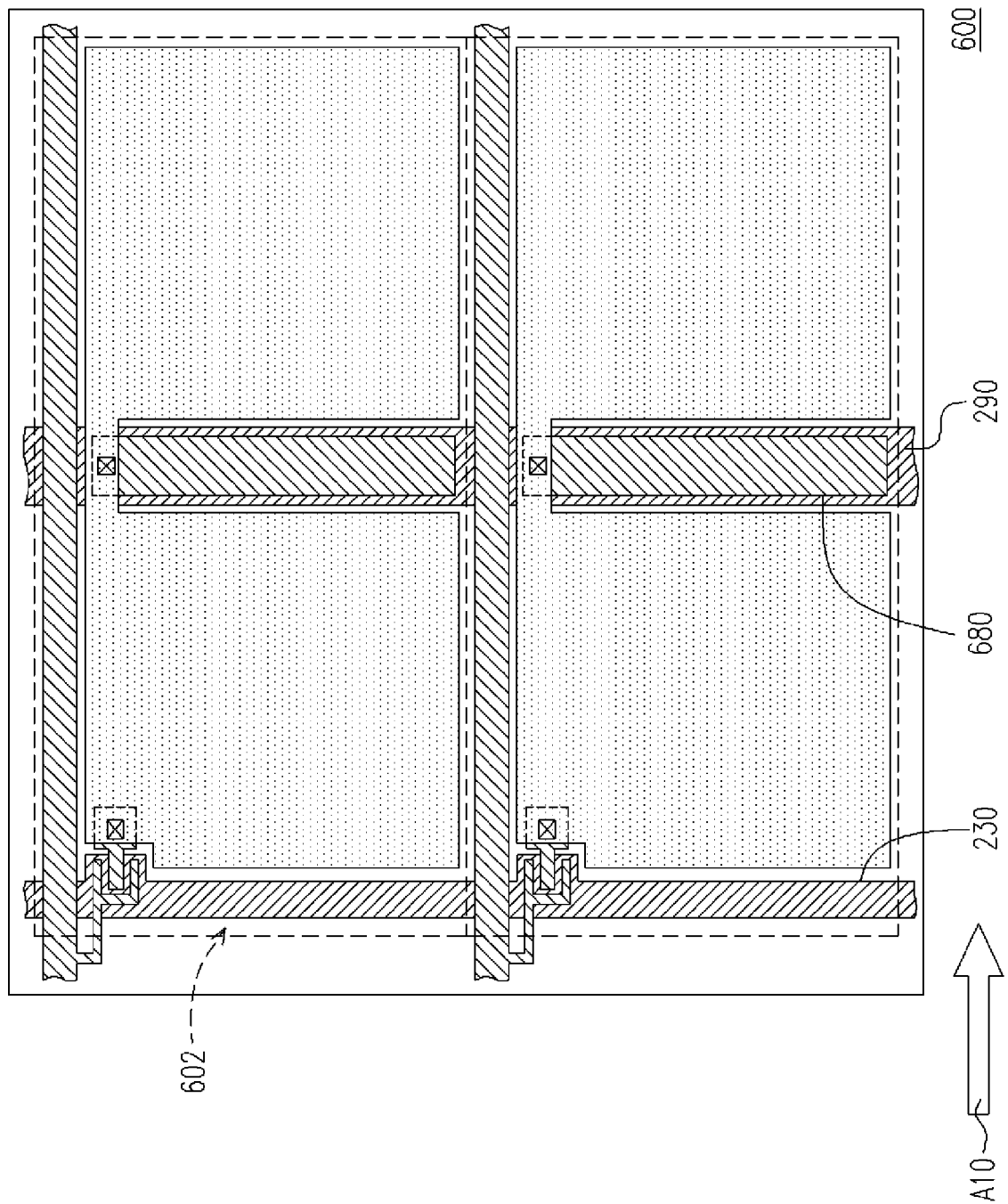
FIG. 6 is a top view of a single pixel area in a pixel array substrate according to a fourth embodiment of the present invention.

FIG. 6 is a top view of a single pixel area in a pixel array substrate according to a fourth embodiment of the present invention. Referring to FIG. 6, the pixel array substrate 600 of this embodiment differs from the pixel array substrate 200 in FIG. 2 in that the position of the capacitor electrodes is changed. The rest of components are indicated with the same symbols and the details will not be described herein again. In this embodiment, the capacitor electrodes 680 do not span the common lines 290, but the capacitor electrodes 680 may span the common lines 290. Referring to FIGS. 3 and 6, in at least one pixel area 602, a portion of the contour of the drain electrode 270 on the gate electrode 240 has a first length L10 (i.e., the sum of the lengths L12, L14, and L16), and a portion of the contour of the capacitor electrode 680 in the pattern of the first patterned conductive layer has a second length (not marked). As the capacitor electrode 680 is entirely disposed on the common line 29, the second length is just the length of the perimeter of the entire capacitor electrode 680.

The ratio of the second length and the first length L10 should be within the range of $\alpha(1+\beta)(1\pm50\%)$, preferably within the range of $\alpha(1+\beta)(1\pm30\%)$, and more preferably substantially equal to $\alpha(1+\beta)$, in TFT array designs such as mask patterns design. Thus, during the exposure of the second patterned conductive layer, even if process deviations such as line width errors are generated because it is difficult to control the process parameters such as exposure time, dose energy, and photoresist thickness precisely and cause the overlapping area deviation of the drain electrodes 270 and the gate electrodes 240 and the overlapping area deviation of the capacitor electrodes 680 and the common lines 290, the overlapping area deviation equals the line width expansion/shrinkage amount multiplying the perimeter length, the ratio can also be kept within the range of $\alpha(1+\beta)(1\pm50\%)$, or $\alpha(1+\beta)(1\pm30\%)$, or even substantially equal to $\alpha(1+\beta)$. In other words, the deviation ratio of the pixel storage capacitance $C_{ST}$ and the gate/drain capacitance $C_{GD}$ can be kept within the range of $\alpha(1+\beta)(1\pm50\%)$, or $\alpha(1+\beta)(1\pm30\%)$, or even substantially equal to $\alpha(1+\beta)$. Definitely, the capacitor electrodes 680 can also be designed to be disposed above the scan lines 230 or other positions of the first patterned conductive layer, or span a side of the first conductive layer similar to the first embodiment.

Figure 7C:
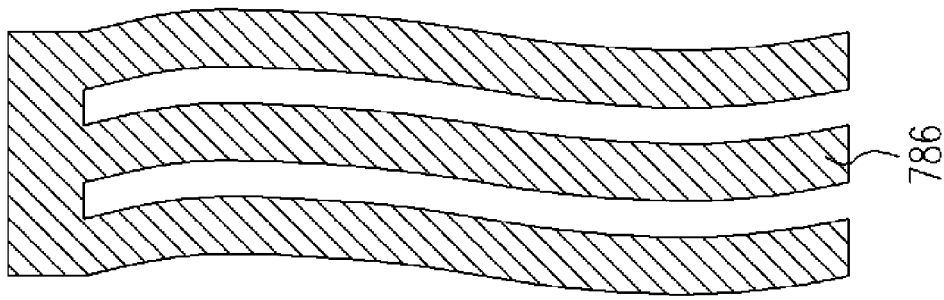
FIGS. 7A-7C are schematic views of other three types of capacitor electrodes according to the fourth embodiment of the present invention.
Figure 7B:
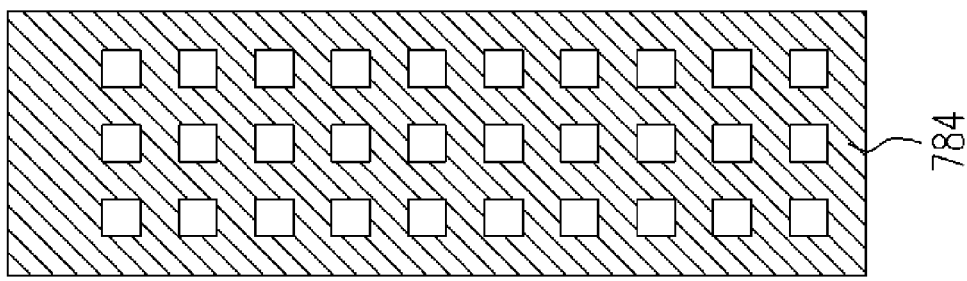
Figure 7A:
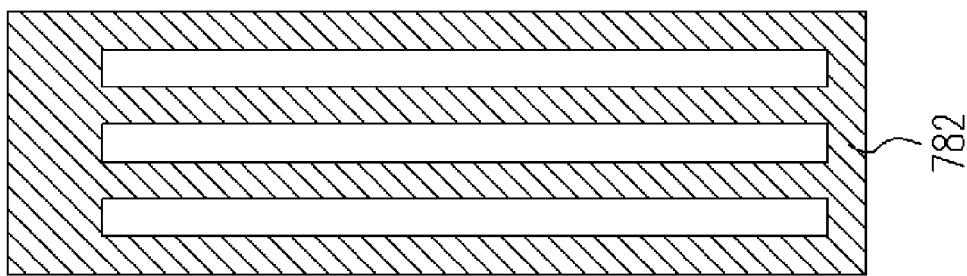

FIGS. 7A-7C are schematic views of other three types of capacitor electrodes according to the fourth embodiment of the present invention. In order to keep the deviation ratio of the pixel storage capacitance $C_{ST}$ and the gate/drain capacitance $C_{GD}$ within the range of $\alpha(1+\beta)(1\pm50\%)$, or $\alpha(1+\beta)(1\pm30\%)$, or even substantially equal to $\alpha(1+\beta)$ easily, the capacitor electrodes 782 are designed to be grid-shaped (as shown in FIG. 7A), or the capacitor electrodes 784 are designed to be net-shaped (as shown in FIG. 7B), or the capacitor electrodes 786 are designed to be curve-shaped (as shown in FIG. 7C), so as to increase the length of the portion of the contour of the capacitor electrodes 782, 784, 786 on the first patterned conductive layer. Definitely, other designs can be used to achieve the same purpose, and the capacitor electrodes 782, 784, 786 are examples for illustration and are not intended for limiting the present invention.

It should be noted that in the above embodiments of the present invention, the capacitor electrodes are not covered by, for example, pixel electrodes or other conductive layers, in order to more precisely keep the deviation ratio of the pixel storage capacitance $C_{ST}$ and the gate/drain capacitance $C_{GD}$ within the range of $\alpha(1+\beta)(1\pm50\%)$, or $\alpha(1+\beta)(1\pm30\%)$, or even substantially equal to $\alpha(1+\beta)$. However, the present invention is not limited to the above principle.

Figure 8:
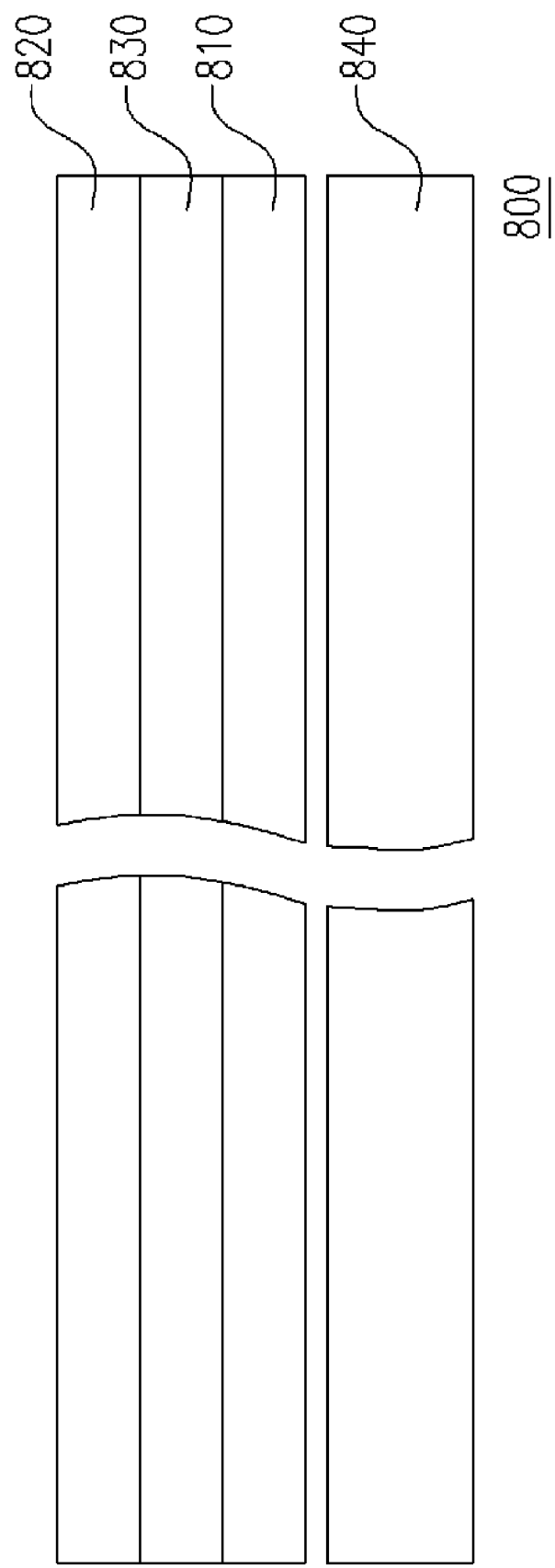
FIG. 8 is a schematic view of an LCD device according to an embodiment of the present invention.

FIG. 8 is a schematic view of an LCD according to an embodiment of the present invention. Referring to FIG. 8, the LCD 800 of this embodiment includes a pixel array substrate 810, an opposite substrate 820 disposed above the pixel array substrate 810, and a liquid crystal layer 830 disposed between the opposite substrate 820 and the pixel array substrate 810. The pixel array substrate 810 is, for example, a pixel array substrate in any of the above embodiments or another pixel array substrate in accordance with the features and spirit of the present invention. Further, the LCD 800, for example, further includes a backlight module 840, and the pixel array substrate 810, the opposite substrate 820, and the liquid crystal layer 830 are disposed on the backlight module 840. The backlight module 840 is used to provide a light source for the LCD 800 to display images. In other words, when the LCD 800 uses an external light source or other light source devices to provide a light source, a backlight module 840 is not required.

In view of the above, in the pixel array substrate and the LCD of the present invention, the deviation ratio of the pixel storage capacitance $C_{ST}$ and the gate/drain capacitance $C_{GD}$ is within the range of $\alpha(1+\beta)(1\pm50\%)$, or $\alpha(1+\beta)(1\pm30\%)$, or even substantially equal to $\alpha(1+\beta)$. Thus, the feed-through voltage $V_F$ of each pixel and the voltage difference $\Delta V_G$ of the scan lines when the TFTs are turned on and turned off are kept at a constant proportion, such that the LCD can provide a uniform image without flickers. In addition, if the drain electrodes and the capacitor electrodes span the side of the first patterned conductive layer in the same direction, and the width ratio of the drain electrodes and the capacitor electrodes in the direction is made to be within the range of $\alpha(1+\beta)(1\pm50\%)$, or $\alpha(1+\beta)(1\pm30\%)$, or even substantially equal to $\alpha(1+\beta)$. When the overlay alignment error occurs between the first and second patterned conductive layers, the feed-through voltage $V_F$ of each pixel may not be affected and the pixel driving voltage can be compensated precisely to avoid image flicker. Further, if the ratio of the lengths of the portions of the contours of the drain electrodes and capacitor electrodes on the first patterned conductive layer is made to be within the range of $\alpha(1+\beta)(1\pm50\%)$, or $\alpha(1+\beta)(1\pm30\%)$, or even substantially equal to $\alpha(1+\beta)$. When process deviations such as the line width error occurs to the second patterned conductive layer, the feed-through voltage $V_F$ of each pixel in each area may not be affected and can be compensated precisely to avoid mura.

Though the present invention has been disclosed above with reference to exemplary embodiments, this is not intended to limit the present invention. Those skilled in the art to which the instant invention pertains will, given the preceding disclosure, be able to envisage and produce modifications and variations without undue experimentation and without departing from the spirit and scope of the present invention. The scope of protection for this invention is limited only by the appended claims.

What is claimed is:

1. A pixel array substrate comprising:
   a substrate;
   a first patterned conductive layer, disposed on the substrate, the first patterned conductive layer at least comprising a plurality of scan lines and a plurality of gate electrodes, wherein each gate electrode is connected to the corresponding scan line;
   a second patterned conductive layer, disposed on the substrate, the second patterned conductive layer at least comprising a plurality of data lines, a plurality of source electrodes, a plurality of drain electrodes, and a plurality of capacitor electrodes, wherein the data lines and the scan lines define a plurality of pixel areas, a plurality of pixel storage capacitances $C_{ST}$ is formed between the capacitor electrodes and the first patterned conductive layer, and a gate/drain capacitance $C_{GD}$ is formed in an overlapping area of each drain electrode and the corresponding gate electrode; and a plurality of pixel electrodes, respectively disposed in the pixel areas on the substrate, wherein each pixel electrode is electrically connected to the corresponding drain electrode and the corresponding capacitor electrode, and a liquid crystal capacitance $C_{LC}$ is formed above each pixel electrode;

wherein in at least one pixel area, the capacitance ratio of the pixel storage capacitance $C_{ST}$ and the gate/drain capacitance $C_{GD}$ is $\alpha$, the capacitance ratio of the liquid crystal capacitance $C_{LC}$ and the pixel storage capacitance $C_{ST}$ is $\beta$, the pixel storage capacitance $C_{ST}$ may has first deviation, the gate/drain capacitance $C_{GD}$ may has a second deviation, and the ratio of the first deviation of the pixel storage capacitance $C_{ST}$ and the second deviation of the gate/drain capacitance $C_{GD}$ is within a range of $\alpha(1+\beta)(1\pm50\%)$.

2. The pixel array substrate as claimed in claim 1, wherein in at least one pixel area, the ratio of the first deviation and the second deviation is within the range of $\alpha(1+\beta)(1\pm30\%)$.

3. The pixel array substrate as claimed in claim 1, wherein in at least one pixel area, the ratio of the first deviation and the second deviation is substantially equal to $\alpha(1+\beta)$.

4. The pixel array substrate as claimed in claim 1, wherein the drain electrodes and the capacitor electrodes span a side of the first patterned conductive layer in a first direction, such that when the first patterned conductive layer and the second patterned conductive layer have an overlay alignment error, the areas of the drain electrodes and the capacitor electrodes overlaid on the first patterned conductive layer increase or decrease simultaneously, and in at least one pixel area, the width of the drain electrode in the first direction is a first width, the width of the capacitor electrode in the first direction is a second width, and the ratio of the second width and the first width is within the range of $\alpha(1+\beta)(1\pm50\%)$.

5. The pixel array substrate as claimed in claim 4, wherein in at least one pixel area, the ratio of the second width and the first width is within the range of $\alpha(1+\beta)(1\pm30\%)$.

6. The pixel array substrate as claimed in claim 4, wherein in at least one pixel area, the ratio of the second width and the first width is substantially equal to $\alpha(1+\beta)$.

7. The pixel array substrate as claimed in claim 4, wherein the capacitor electrodes span a side of the scan lines in the first direction.

8. The pixel array substrate as claimed in claim 4, wherein the first patterned conductive layer further comprises a plurality of common lines, and the capacitor electrodes span a side of the common lines in the first direction.

9. The pixel array substrate as claimed in claim 1, wherein in at least one pixel area, a portion of the contour of the drain electrode on the gate electrode has a first length, a portion of the contour of the capacitor electrode within an area of the first patterned conductive layer has a second length, and the ratio of the second length and the first length is within the range of $\alpha(1+\beta)(1\pm50\%)$.

10. The pixel array substrate as claimed in claim 9, wherein in at least one pixel area, the ratio of the second length and the first length is within the range of $\alpha(1+\beta)(1\pm30\%)$.

11. The pixel array substrate as claimed in claim 9, wherein in at least one pixel area, the ratio of the second length and the first length is substantially equal to $\alpha(1+\beta)$.

12. The pixel array substrate as claimed in claim 9, wherein the capacitor electrodes are located above the scan lines.

13. The pixel array substrate as claimed in claim 9, wherein the first patterned conductive layer further comprises a plurality of common lines, and the capacitor electrodes are located above the common lines.

14. An LCD device, comprising:
a pixel array substrate, comprising:
  a substrate;
  a first patterned conductive layer, disposed on the substrate, the first patterned conductive layer at least comprising a plurality of scan lines and a plurality of gate electrodes, wherein each gate electrode is connected to the corresponding scan line;
  a second patterned conductive layer, disposed on the substrate, the second patterned conductive layer at least comprising a plurality of data lines, a plurality of source electrodes, a plurality of drain electrodes, and a plurality of capacitor electrodes, wherein the data lines and the scan lines define a plurality of pixel areas, a plurality of pixel storage capacitances $C_{ST}$ is formed between the capacitor electrodes and the first patterned conductive layer, and a gate/drain capacitance $C_{GD}$ is formed in an overlapping area of each drain electrode and the corresponding gate electrode;
  a plurality of pixel electrodes, respectively disposed in the pixel areas on the substrate, wherein each pixel electrode is electrically connected to the corresponding drain electrode and the corresponding capacitor electrode, and a liquid crystal capacitance $C_{LC}$ is formed above each pixel electrode,
  wherein in at least one pixel area, the capacitance ratio of the pixel storage capacitance $C_{ST}$ and the gate/drain capacitance $C_{GD}$ is $\alpha$, the capacitance ratio of the liquid crystal capacitance $C_{LC}$ and the pixel storage capacitance $C_{ST}$ is $\beta$, the pixel storage capacitance $C_{ST}$ may has first deviation, the gate/drain capacitance $C_{GD}$ may has a second deviation, and the ratio of the first deviation and the second deviation is within a range of $\alpha(1+\beta)(1\pm50\%)$;
an opposite substrate, disposed above the pixel array substrate; and
a liquid crystal layer, disposed between the opposite substrate and the pixel array substrate.

15. The LCD device as claimed in claim 14, wherein in at least one pixel area, the ratio of the first deviation and the second deviation is within the range of $\alpha(1+\beta)(1\pm30\%)$.

16. The LCD device as claimed in claim 14, wherein in at least one pixel area, the ratio of the first deviation and the second deviation is substantially equal to $\alpha(1+\beta)$.

17. The LCD device as claimed in claim 14, wherein the drain electrodes and the capacitor electrodes span a side of the first patterned conductive layer in a first direction, such that when the first patterned conductive layer and the second patterned conductive layer have an overlay alignment error, the areas of the drain electrodes and the capacitor electrodes overlaid on the first patterned conductive layer increase or decrease simultaneously, and in at least one pixel area, the width of the drain electrode in the first direction is a first width, the width of the capacitor electrode in the first direction is a second width, and the ratio of the second width and the first width is within the range of $\alpha(1+\beta)(1\pm50\%)$.

18. The LCD device as claimed in claim 17, wherein in at least one pixel area, the ratio of the second width and the first width is within the range of $\alpha(1+\beta)(1\pm30\%)$.

19. The LCD device as claimed in claim 17, wherein in at least one pixel area, the ratio of the second width and the first width is substantially equal to $\alpha(1+\beta)$.

20. The LCD device as claimed in claim 17, wherein the capacitor electrodes span a side of the scan lines in the first direction.

21. The LCD device as claimed in claim 17, wherein the first patterned conductive layer further comprises a plurality of common lines, and the capacitor electrodes span a side of the common lines in the first direction.

22. The LCD device as claimed in claim 14, wherein in at least one pixel area, a portion of the contour of the drain electrode on the gate electrode has a first length, a portion of the contour of the capacitor electrode within an area of the first patterned conductive layer has a second length, and the ratio of the second length and the first length is within the range of $\alpha(1+\beta)(1\pm50\%)$.

23. The LCD device as claimed in claim 22, wherein in at least one pixel area, the ratio of the second length and the first length is within the range of $\alpha(1+\beta)(1\pm30\%)$.

24. The LCD device as claimed in claim 22, wherein in at least one pixel area, the ratio of the second length and the first length is substantially equal to $\alpha(1+\beta)$.

25. The LCD device as claimed in claim 22, wherein the capacitor electrodes are located above the scan lines.

26. The LCD device as claimed in claim 22, wherein the first patterned conductive layer further comprises a plurality of common lines, and the capacitor electrodes are located above the common lines.

* * * * *